United States Patent
Chang

(10) Patent No.: US 10,097,770 B2
(45) Date of Patent: Oct. 9, 2018

(54) IMAGE CAPTURING APPARATUS AND IMAGE PROCESSING METHOD THEREOF

(71) Applicant: Coretronic Corporation, Hsin-Chu (TW)

(72) Inventor: Chuan-Chung Chang, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 65 days.

(21) Appl. No.: 15/340,993

(22) Filed: Nov. 2, 2016

(65) Prior Publication Data
US 2017/0201667 A1 Jul. 13, 2017

(30) Foreign Application Priority Data
Jan. 8, 2016 (CN) .......................... 2016 1 0012548

(51) Int. Cl.
*H04N 5/235* (2006.01)
*G06T 5/50* (2006.01)
(Continued)

(52) U.S. Cl.
CPC ........... *H04N 5/2355* (2013.01); *G06T 5/001* (2013.01); *G06T 5/009* (2013.01); *G06T 5/20* (2013.01); *G06T 5/50* (2013.01); *G06T 11/60* (2013.01); *H04N 5/2253* (2013.01); *H04N 5/2254* (2013.01); *H04N 5/2351* (2013.01);
(Continued)

(58) Field of Classification Search
CPC ............. H04N 5/2355; H04N 5/23254; H04N 5/23229
See application file for complete search history.

(56) References Cited

U.S. PATENT DOCUMENTS
7,419,267 B2 9/2008 Whitehead et al.
7,431,461 B2 10/2008 Nitta et al.
(Continued)

FOREIGN PATENT DOCUMENTS
CN 103108134 5/2013
CN 104349069 2/2015
(Continued)

OTHER PUBLICATIONS
Vladimir Koifman, "Chipworks Reveals Omnivision Split Pixel Internals," Dec. 10, 2008, available at:http://image-sensors-world.blogspot.tw/2008/12/chipworks-reveals-omnivision-split.html.
(Continued)

*Primary Examiner* — Christopher K Peterson
(74) *Attorney, Agent, or Firm* — JCIPRNET

(57) ABSTRACT

An image processing method adapted to be executed by an image capturing apparatus. The image capturing apparatus comprises a processing circuit and a light field camera. The image processing method includes: obtaining by using the light field camera a first image and a second image each including a plurality of sub-regions; performing a local brightness redistribution process on at least one of the sub-regions of the second image according to a brightness distribution of at least one of the sub-regions of the first image; performing an image rendering process on the first image and the second image to obtain a third image; and performing a global brightness redistribution process on the third image to obtain a fourth image.

15 Claims, 3 Drawing Sheets

(51) Int. Cl.
*G06T 5/00* (2006.01)
*G06T 11/60* (2006.01)
*H04N 5/225* (2006.01)
*H04N 5/232* (2006.01)
*G06T 5/20* (2006.01)
*H04N 5/369* (2011.01)

(52) U.S. Cl.
CPC ....... *H04N 5/2356* (2013.01); *H04N 5/23229* (2013.01); *G06T 2207/10052* (2013.01); *G06T 2207/20021* (2013.01); *G06T 2207/20208* (2013.01); *G06T 2207/20221* (2013.01); *H04N 5/369* (2013.01)

(56) References Cited

U.S. PATENT DOCUMENTS

| | | | |
|---|---|---|---|
| 7,453,475 | B2 | 11/2008 | Nitta et al. |
| 8,228,417 | B1 | 7/2012 | Georgiev et al. |
| 8,229,294 | B2 | 7/2012 | Agrawal et al. |
| 8,345,144 | B1 | 1/2013 | Georgiev et al. |
| 8,471,920 | B2 | 6/2013 | Georgiev et al. |
| 8,797,434 | B2 | 8/2014 | Lee et al. |
| 8,861,089 | B2 | 10/2014 | Duparre |
| 8,866,920 | B2 | 10/2014 | Venkataraman et al. |
| 8,885,059 | B1 | 11/2014 | Venkataraman et al. |
| 8,896,719 | B1 | 11/2014 | Venkataraman et al. |
| 8,902,321 | B2 | 12/2014 | Venkataraman et al. |
| 8,908,058 | B2 | 12/2014 | Akeley et al. |
| 9,030,550 | B2 | 5/2015 | Georgiev |
| 9,031,343 | B2 | 5/2015 | Venkataraman et al. |
| 9,041,823 | B2 | 5/2015 | Venkataraman et al. |
| 9,041,829 | B2 | 5/2015 | Venkataraman et al. |
| 9,042,667 | B2 | 5/2015 | Venkataraman et al. |
| 9,047,666 | B2 | 6/2015 | Chen et al. |
| 9,049,367 | B2 | 6/2015 | Venkataraman et al. |
| 9,049,381 | B2 | 6/2015 | Venkataraman et al. |
| 9,049,390 | B2 | 6/2015 | Venkataraman et al. |
| 9,049,391 | B2 | 6/2015 | Venkataraman et al. |
| 9,049,411 | B2 | 6/2015 | Venkataraman et al. |
| 9,055,213 | B2 | 6/2015 | Venkataraman et al. |
| 9,055,233 | B2 | 6/2015 | Venkataraman et al. |
| 9,060,120 | B2 | 6/2015 | Venkataraman et al. |
| 9,060,121 | B2 | 6/2015 | Venkataraman et al. |
| 9,060,124 | B2 | 6/2015 | Venkataraman et al. |
| 9,060,142 | B2 | 6/2015 | Venkataraman et al. |
| 9,077,893 | B2 | 7/2015 | Venkataraman et al. |
| 2011/0234841 | A1* | 9/2011 | Akeley ................. H04N 5/232 348/222.1 |
| 2012/0314100 | A1 | 12/2012 | Frank |
| 2014/0246561 | A1 | 9/2014 | Chen et al. |
| 2016/0044216 | A1* | 2/2016 | Chang ................. H04N 5/2254 348/360 |

FOREIGN PATENT DOCUMENTS

| | | |
|---|---|---|
| JP | 2012217102 | 11/2012 |
| JP | 2013025816 | 2/2013 |
| JP | 2013187681 | 9/2013 |
| JP | 2014155121 | 8/2014 |
| JP | 2015027067 | 2/2015 |
| JP | 2015144416 | 8/2015 |
| TW | I475512 | 3/2015 |

OTHER PUBLICATIONS

Anna Aleryd, "Shoot great videos in all conditions with the new HDR functionality in Xperia™ Z," available at: http://developer.sonymobile.com/2013/01/22/shoot-great-videos-in-all-conditions-with-the-new-hdr-functionality-in-xperia-z/.

Vladimir Koifman, "Fujifilm Proposes RGBW Pixels with Different Size ," Jan. 17, 2014, available at:http://image-sensors-world.blogspot.tw/2014/01/fujifilm-proposes-rgbw-pixel-scaling.html.

Vladimir Koifman, "EDN Discusses Image Sensors for Embedded Vision Systems ," Jun. 14, 2012, available at: http://image-sensors-world.blogspot.tw/2012/06/edn-discusses-image-sensors-for.html.

Vladimir Koifman, "Sony View-DR HDR Technology ," Jun. 16, 2011, available at:http://image-sensors-world.blogspot.tw/2011/06/sony-view-dr-hdr-technology.html.

Vladimir Koifman, "Toshiba Starts Mass Production of HDR VGA Sensor ," Mar. 27, 2014, available at:http://image-sensors-world.blogspot.tw/2014/03/toshuba-starts-mass-production-of-hdr.html.

Vladimir Koifman, "Sony Explains HDR Video Mode in its Stacked Sensor ," Jan. 25, 2013, available at:http://image-sensors-world.blogspot.tw/2013/01/sony-explains-hdr-video-mode-in-its.html.

Vladimir Koifman, "ON Semi Announces 1080p60 HDR Video Sensor ," Dec. 9, 2014, available at:http://image-sensors-world.blogspot.tw/2014/12/on-semi-announces-1080p60-hdr-video.html.

"Office Action of Japan Counterpart Application," dated Sep. 26, 2017, p. 1-p. 11.

* cited by examiner

IMAGE CAPTURING APPARATUS AND IMAGE PROCESSING METHOD THEREOF

CROSS-REFERENCE TO RELATED APPLICATION

This application claims the priority benefit of China application serial no. 201610012548.7, filed on Jan. 8, 2016. The entirety of the above-mentioned patent application is hereby incorporated by reference herein and made a part of this specification.

BACKGROUND OF THE INVENTION

Field of the Invention

The invention relates to an image capturing apparatus and an image processing method thereof; more particularly, the invention relates to a light field camera and an image processing method thereof.

Description of Related Art

When a scene to be photographed is characterized by high contrast, e.g., if the scene contains sky with high brightness or dark shadow with low brightness, or if an intense light directly irradiates the lens, the signal intensity of the regions with high brightness may reach or approach a saturated value because the image sensing component of the conventional image capturing apparatus can merely convert an optical signal into an electric signal in a restricted manner while fixed parameters (e.g., exposure time, gain, etc.) are given. To prevent the intensity of the electrical signal in the regions with high brightness from approaching or reaching the saturated value, it is likely to adjust parameters (e.g., the exposure time) of the image sensing component to reduce the intensity of the electrical signal in the regions with high brightness, which however significantly reduces the intensity of the electrical signal in the regions with low brightness and thus results in the fact that the intensity of the electrical signal in the regions with low brightness approximates to the intensity of the noise of the image sensing component. Hence, when the resolution of the image in the regions with high brightness is compromised due to the saturation of the electrical signal in the regions with high brightness, or when the relevant parameters are adjusted in order not to saturate the signal intensity of the regions with high brightness, the intensity of the signal in the regions with low brightness still approximates to the intensity of the noise, and accordingly the resolution of the image in the regions with low brightness is lessened. Although proper hardware or software may be adopted, the resolutions of the images in the regions with high brightness and low brightness cannot be both taken into consideration according to the related art. To resolve the issues described above, a number of methods for ensuring images to have high dynamic range (HDR, also referred to as "wide dynamic range, WDR") have been proposed.

The information disclosed in this "Description of Related Art" section is only for enhancement of understanding of the background of the described technology and therefore it may contain information that does not form the prior art that is already known to a person of ordinary skill in the art. Further, the information disclosed in this "Description of Related Art" section does not mean that one or more problems to be resolved by one or more embodiments of the invention were acknowledged by a person of ordinary skill in the art.

SUMMARY OF THE INVENTION

The invention provides an image capturing apparatus comprises a light field camera and a processing circuit. The light field camera is capable of providing images with favorable quality and an image processing method adapted to be executed by the processing circuit of the image capturing apparatus.

Other objects and advantages of the invention can be further illustrated by the technical features broadly embodied and described as follows.

In order to achieve one or a portion of or all of the objects or other objects, an embodiment of the invention provides an image processing method adapted to be executed by the image capturing apparatus. The image processing method includes: obtaining a first image and a second image by using the light field camera where each including a plurality of sub-regions; performing a local brightness redistribution process on at least one of the sub-regions of the second image according to a brightness distribution of at least one of the sub-regions of the first image; performing an image rendering process on the first image and the second image to obtain a third image; and performing a global brightness redistribution process on the third image to obtain a fourth image.

In order to achieve one or a portion of or all of the objects or other objects, an embodiment of the invention provides an image capturing apparatus. The image capturing apparatus comprises a light field camera and a processing circuit. The light field camera is electrically connected to a processing circuit. The processing circuit is configured to execute the image processing method. The light field camera includes a lens module, a lens array, and an image sensing component. The lens module is located between an object side and an image side. Besides, the lens module has a first F-number. The lens array is arranged between the lens module and the image side. The lens array includes a plurality of sub-lenses. Each of the sub-lenses has a second F-number. The lens module focuses a middle image between the lens module and the lens array. The first F-number is different from the second F-number. The image sensing component is arranged at the image side. The image sensing component is configured to sense a light field image. The lens array focuses the light field image onto the image sensing component.

In view of the above, the image capturing apparatus and the image processing method thereof as provided herein may achieve at least one of advantages or effects as listed below. The image capturing apparatus comprises the light field camera and the processing circuit. In an embodiment of the invention, the design of the image capturing apparatus satisfies the predetermined standard conditions, and the filtrate of each sub-region in the image captured by the light field camera is high, such that the number of wasted pixels can be reduced, and the pixel utilization rate of the light filed camera is satisfactory. In addition, the image processing method provided herein allows the light field camera to have capabilities for capturing localized HDR images and for providing images with high quality.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
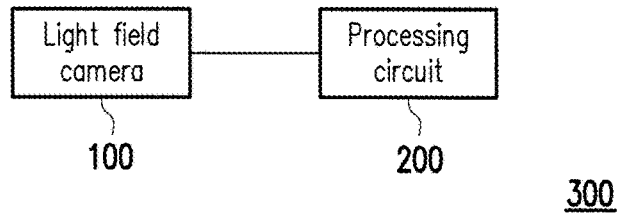
FIG. 1 is schematic brief view of an image capturing apparatus according to an embodiment of the invention.
Figure 2:
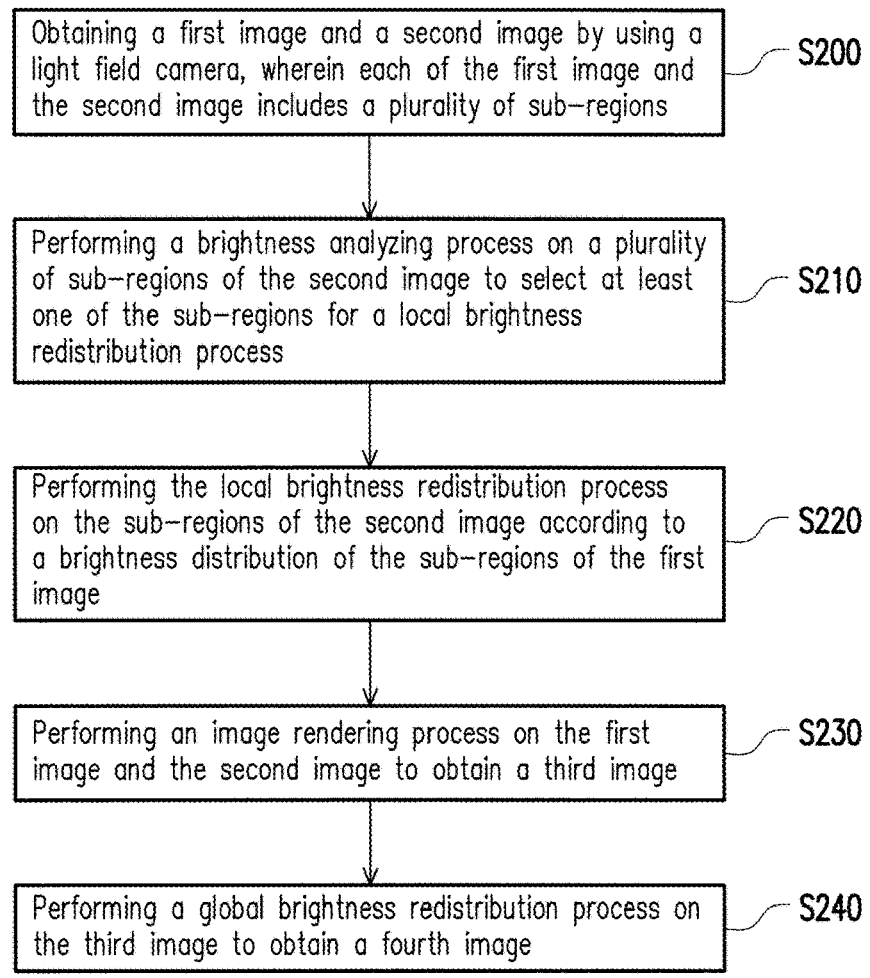
FIG. 2 is a flowchart of an image processing method according to an embodiment of the invention.

FIG. 1 is schematic brief view of an image capturing apparatus according to an embodiment of the invention. FIG. 2 is a flowchart of an image processing method according to an embodiment of the invention. With reference to FIG. 1 and FIG. 2, in the embodiment, the image capturing apparatus 300 includes a light field camera 100 and a processing circuit 200. The light field camera 100 is electrically connected to the processing circuit 200. The image capturing apparatus 300 may be a portable device or may electrically connect to a display (such as a monitor or a projector) to display the image transmitted from the processing circuit 200. The light field camera 100 may be a device with optical components for capturing image light. In the embodiment, the light field camera 100 is, for instance, selected from one of the focus type light field camera, the non-focus type light field camera, and the light field camera including a camera array, which should however not be construed as a limitation to the invention.

The processing circuit 200 provided herein is configured to at least execute the image processing method depicted in FIG. 2. In step S200, the processing circuit 200 obtains a first image and a second image by using the light field camera 100, and each of the first image and the second image includes a plurality of sub-regions. In step S210, the processing circuit 200 performs a brightness analyzing process on the sub-regions of the second image to select at least one of the sub-regions of the second image for performing a local brightness redistribution process. In step S220, the processing circuit 200 performs the local brightness redistribution process on at least one of the sub-regions of the second image according to a brightness distribution of at least one of the sub-regions of the first image. In step S230, the processing circuit 200 performs an image rendering process on the first image and the second image to obtain a third image. In step S240, the processing circuit 200 performs a global brightness redistribution process on the third image to obtain a fourth image. As provided above, the image processing method depicted in FIG. 2 allows the light field camera 200 to have capabilities for capturing localized high dynamic range (HDR) or wide dynamic range (WDR) images and for providing quality images.

In the embodiment, the local brightness redistribution process is performed through re-adjusting the brightness of partial regions (e.g., one or more sub-regions) in the captured image. By contrast, the global brightness redistribution process is performed through re-adjusting the brightness of the overall captured image (e.g., the entire region of the captured image), for instance. Besides, according to actual design requirement, the processing circuit 200 provided in the embodiment can be integrated into the light field camera 100 or independent from the light field camera 100, which should not be construed as a limitation to the invention. In the embodiment, the processor circuit 200 includes, for instance, a central processing unit (CPU), a microprocessor, a digital signal processor (DSP), a programmable controller, a programmable logic device (PLD), any other similar apparatus, or a combination thereof, which should not be construed as limitations to the invention.

Figure 3:
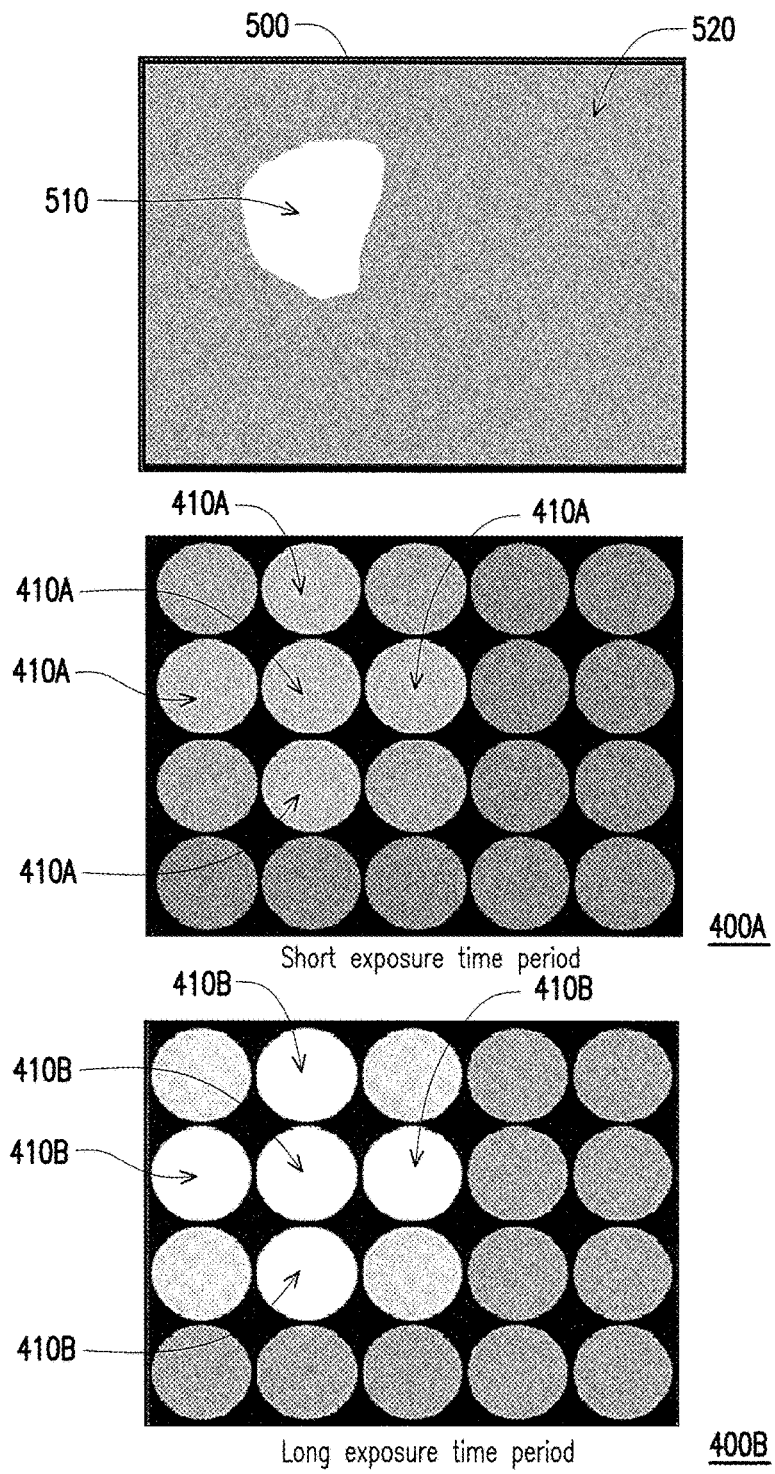
FIG. 3 is schematic brief view illustrating a scene to be photographed by a light field camera and an image captured by the light field camera according to an embodiment of the invention
Figure 4:
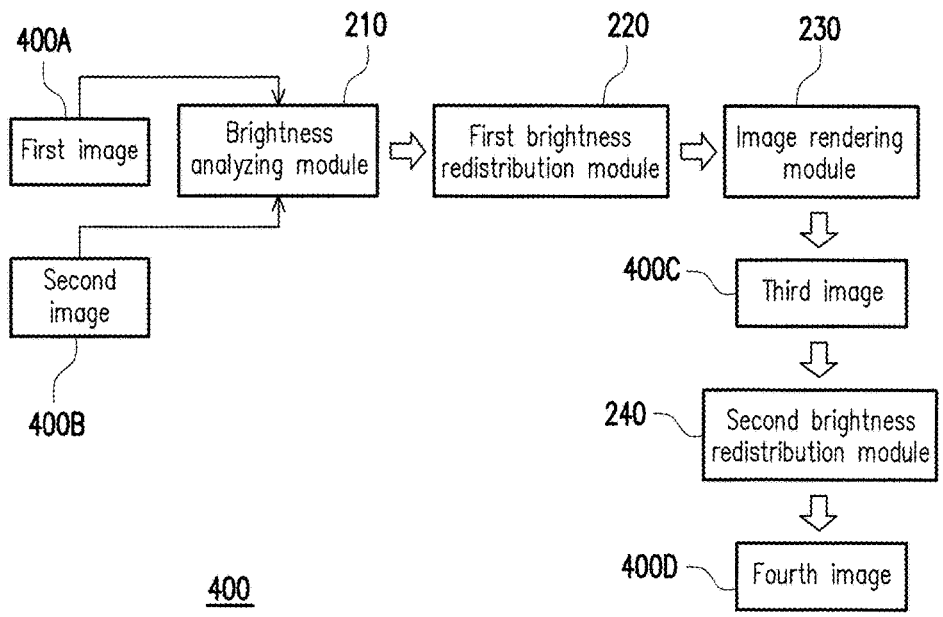
FIG. 4 is schematic brief view of an image processing module according to an embodiment of the invention.

FIG. 3 is schematic brief view illustrating a scene to be photographed by the light field camera and an image captured by the light field camera according to the embodiment of the invention. FIG. 4 is schematic brief view of an image processing module according to the embodiment of the invention. With reference to FIG. 1 to FIG. 4, the image processing module 400 provided in the embodiment serves to perform the image processing method depicted in FIG. 2 on the first image 400A and the second image 400B that are captured by the light field camera 100, so as to generate a fourth image 400D capable of achieving the HDR effect. In the embodiment, the image processing module 400 includes a brightness analyzing module 210, a first brightness redistribution module 220, an image rendering module 230, and a second brightness redistribution module 240 which are configured to perform steps in the image processing method depicted in FIG. 2.

Specifically, in the embodiment, the scene to be photographed by the light field camera 100 contains a region 510 with high brightness and a region 520 with low brightness, and the captured image is as the scene image 500 shown in FIG. 3. The scene image 500 is, for instance, the region that has the high brightness and is captured by a non-light field camera (i.e., the region 510 with high brightness). The first image 400A and the second image 400B are, for instance, images which are captured by the light field camera 100 having characteristics that visions of sub-images partially are overlapped. For instance, in the first image 400A, brighter sub-regions indicate that the image intensity of the sub-regions approaches or reaches the saturated value, gray sub-regions correspond to regions around the border of the region 510 with high brightness in the first image 400A, and darker sub-regions correspond to regions away from the region 510 with high brightness in the first image 400A. As shown in FIG. 3, when the light field camera 100 is applied to capture the image in which partial regions have the high brightness, the characteristics of the light field camera 100 allow the to-be-photographed scene (i.e., the scene image 500) to be spatially divided based on the intensity.

In the embodiment, the light field camera 100 obtains the first image 400A and the second image 400B at a first exposure time and a second exposure time, respectively. Besides, the length of the first exposure time is different from the length of the second exposure time. For instance, in the embodiment, the light field camera 100 adopts the time division exposure mechanism, for instance. The light field camera 100 takes the image of the to-be-photographed scene at different exposure times according to the built-in exposure time parameters or the control method. For instance, the light field camera 100 can take one image within a longer exposure time period and one image within a shorter exposure time period, which should not be construed as a limitation to the invention. In the embodiment, the light field camera 100 can take different numbers of light field images based on other exposure conditions. For instance, the images respectively taken within the longer exposure time period and the shorter exposure time period are the first image 400A and the second image 400B obtained by taking the scene image 500 with using of the light field camera 100. The first image 400A is the image taken within the shorter exposure time period, and the second image 400B is the image taken within the longer exposure time period. Due to the difference in the exposure time periods within which the first and second images 400A and 400B are taken, the region with the overly high brightness in the scene image 500 (e.g., the region 510 with high brightness) appears to have lower brightness in the first image 400A taken within the short exposure time period.

After the first image 400A and the second image 400B are obtained by the light field camera 100, the brightness analyzing module 210 is configured to perform the brightness analyzing process on the sub-regions of the second image 400B, and select at least one of the sub-regions of the second image 400B for providing the local brightness redistribution process. That is, in the embodiment, the brightness analyzing module 210 performs the brightness analyzing process on the second image 400B adopting the longer exposure time parameters, i.e., the brightness analyzing module 210 determines the brightness of the sub-regions is saturated or becomes higher than the predetermined threshold and records the locations of the sub-regions in the second image 400B. According to the embodiment, the sub-regions with the brightness being saturated or becoming higher than the predetermined threshold are the sub-regions 410B in the second image 400B.

In the embodiment, the first brightness redistribution module 220 then performs the local brightness redistribution process on the sub-regions 410B of the second image 400B according to the brightness distribution of the sub-regions 410A of the first image 400A, and the locations of the sub-regions 410A correspond to the locations of the sub-regions 410B. Specifically, the first brightness redistribution module 220 obtains the sub-regions 410A of the first image 400A according to the recorded locations of the sub-regions 410B, and the first image 400A is obtained by adopting the shorter exposure time parameters. In the embodiment, the locations, the number, and the arrangement of the sub-regions 410A and 410B in the first image 400A and the second image 400B are exemplary and should not be construed as limitations to the invention. The first brightness redistribution module 220 then applies the HDR algorithm to perform the local brightness redistribution process on the sub-regions 410A and 410B through adopting different brightness distribution parameters, so as to obtain the processed image of the sub-regions. In the embodiment, the local brightness redistribution process is performed through re-adjusting the brightness of partial regions (e.g., one or more sub-regions) in the captured image. The local brightness redistribution process is performed through adopting different brightness distribution parameters, and different parameters corresponding to respective sub-regions are applied to adjust the brightness of each sub-region, for instance. The brightness of each sub-region can be adjusted to the same degree or in different manner.

In the embodiment, the first brightness redistribution module 220 combines the processed sub-regions with the sub-regions 410A or 410B to reduce the noise of the image. For instance, in an embodiment of the invention, the first brightness redistribution module 220 combines the processed sub-regions with the sub-regions 410B with high brightness, so as to reduce the noise of the image of the dark regions. Applying the algorithm to redistribute the brightness of the sub-regions and combining the processed and the non-processed sub-regions by the first brightness redistribution module 220 can be derived from the related art and thus will not be elaborated hereinafter.

In the embodiment, the image rendering module 230 performs an image rendering process on the first image 400A and the second image 400B to obtain a third image 400C. Here, the image rendering module 230 performs the image rendering process based on the parameters adopted by the light field camera 100, for instance. During the image rendering process, the image rendering module 230 can perform the brightness redistribution process on different sub-regions, so as to resolve the issue of uneven brightness of different sub-regions caused by the image rendering process. After the image rendering process is performed, the third image 400C output by the image rendering module 230 is a non-light field image, for instance. In the embodiment, the second brightness redistribution module 240 performs a global brightness redistribution process on the third image 400C to obtain a fourth image 400D. The global brightness redistribution process is performed through re-adjusting the brightness of the overall captured third image 400C (e.g., the entire region of the third image 400C), for instance. Hence, after the global brightness redistribution process is performed on the entire third image 400C, the second brightness redistribution module 240 generates and outputs the image 400D that achieves the HDR effect. Besides, in the embodiment, the global brightness redistribution process includes tone mapping, which is a technology in the field of computer graphics and can be applied to approximate the appearance of HDR images in a medium that has limited dynamic range. Performing the image rendering process and the brightness redistribution process as provided above can be derived from the related art and thus will not be elaborated hereinafter.

In the embodiment, the image processing module 400 can be implemented in form of software, hardware, firmware, and/or a combination thereof. For instance, if the image processing module 400 is implemented in form of software, the processing circuit 200 is configured to execute each software module in the image processing module, so as to perform each step in the image processing method depicted in FIG. 2. Each software module provided in the embodiment may include adopting any proper algorithm to perform each step in the image processing method and should not be construed as a limitation to the invention, and the algorithm described above can be derived from the related art and thus will not be elaborated hereinafter. If the image processing module 400 is implemented in form of hardware, each hardware module in the image processing module may be implemented in form of any appropriate circuit structure in the pertinent field and should not be construed as a limitation to the invention, and the circuit structure described above can be derived from the related art and thus will not be elaborated hereinafter.

Figure 5:
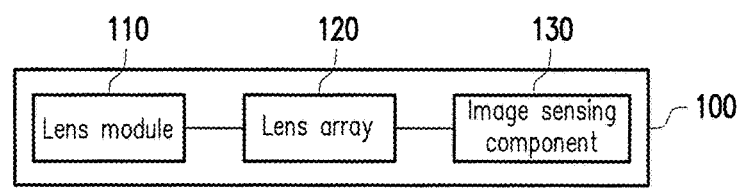
FIG. 5 is brief block view of a light field camera according to an embodiment of the invention.
Figure 6:
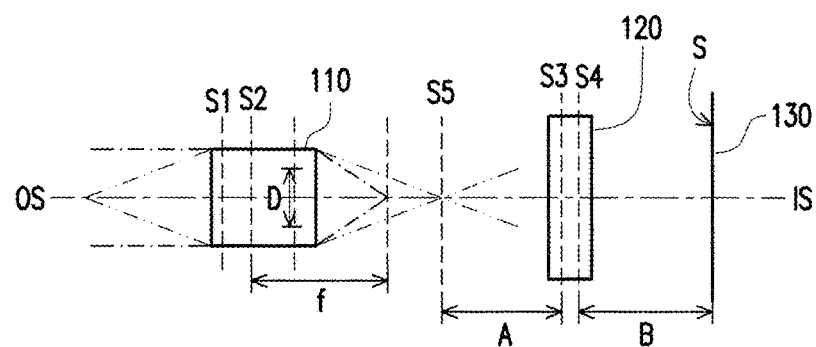
FIG. 6 is brief view of a structure of a light field camera according to an embodiment of the invention.

FIG. 5 is brief block view of a light field camera according to an embodiment of the invention. FIG. 6 is brief view of a structure of a light field camera according to an embodiment of the invention. With reference to FIG. 5 and FIG. 6, the light field camera 100 provided in the embodiment includes a lens module 110, a lens array 120, and a lens sensing component 130. The lens module 110 is located between an object side OS and an image side IS. The lens array 120 is arranged between the lens module 110 and the image sensing component 130. The image sensing component 130 is arranged at the image side IS.

In particular, the lens module 110 in the embodiment serves to focus a middle image between the lens module 110 and the lens array 120, e.g., focus the middle image on an imaging plane S5. The image sensing component 130 is configured to sense the light field image, e.g., the first image 400A and the second image 400B. The lens array 120 is configured to focus the light field image onto the image sensing component 130. In the embodiment, the lens module 110 has a first F-number, the lens array 120 includes a plurality of sub-lenses, each of the sub-lenses has a second F-number, and the first F-number is different from the second F-number. In the embodiment of the invention, the lens module 110 may comprise a plurality of lenses for capturing the image light from the object side OS. The lens array 120 may be a microlens array, for example.

According to the embodiment, the lens module 110 includes a first principle plane S1 and a second principle plane S2, and the lens array 120 includes a third principle plane S3 and a fourth principle plane S4. In general, the lens module 110 and the lens array 120 can be composed of plural lenses or micro-lenses, respectively. In order to simplify the illustration, the internal structure of the lens module 110 is simplified in the drawings, i.e., only the equivalent first and second principle planes S1 and S2 are shown, and the internal structure of the lens array 120 is simplified in the drawings, i.e., only the equivalent third and fourth principle planes S3 and S4 are shown. The definition of each principle plane can be derived from the related art and thus will not be elaborated hereinafter. In the embodiment, the ratio A/B of the distance A between the middle image (i.e., the image on the imaging plane S5) and the third principle plane S3 of the lens array 120 to the distance B between the fourth principle plane S4 of the lens array 120 and the image sensing component 130 is N. When N is greater than 2, the image sensing component 130 can achieve favorable imaging effects. Here, S is the image sensing plane of the image sensing component 130. According to the embodiment, an effective focal length of the lens module 110 is f, a diameter of an exit pupil of the lens module is D, the second F-number of the lens array 120 is F, and the effective focal length f, the diameter D of the exit pupil, and the second F-number F satisfy the following formula (1):

$$\frac{1}{N}F \le \frac{f}{D} \le \left(2 + \frac{1}{N}\right)F \quad (1)$$

In a focus type light field camera, for instance, the object to be photographed by the lens module 110 may be considered by the lens array 120 as the middle image of an actual object or a virtual object, and the middle image is transformed into an actual image on the image sensing component 130 by the lens array 120. The distance from the lens array 120 to the image sensing component 130 is not equal to the focal length of the lens array 120. With use of the light field camera 100 that satisfies the above formula (1), the fillrate of each sub-region in the image captured by the light field camera 100 is higher, such that the number of wasted pixels can be reduced. After the image processing method depicted in FIG. 2 is applied to the light field camera 100, the light field camera 100 is not only characterized by the higher pixel utilization rate but also capable of taking local HDR images.

The image sensing component 130 provided in the embodiments of the invention includes a charge coupled device (CCD) image sensor, a complementary metal oxide semiconductor (CMOS) image sensor, any other similar apparatus, or a combination thereof, which should however not be construed as a limitation to the invention. The internal lens structure of the lens module 110 and that of the lens array 120 can be implemented in form of any appropriate lens components in the related art and should not be construed as a limitation to the invention, and the lens module 110 and the lens array 120 described above can also be derived from the related art and thus will not be elaborated hereinafter.

To sum up, the light field camera and the image processing method thereof provided in the embodiments of the invention may achieve at least one of advantages or effects as listed below. In an exemplary embodiment of the invention, the design of the light field camera satisfies the predetermined standard conditions, and the image captured by the light field camera and processed by the image processing method provided herein can have favorable image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An image processing method adapted to be executed by an image capturing apparatus comprised a processing circuit and a light field camera electrically connected with the processing circuit, the image processing method comprising:
    obtaining a first image and a second image by using the light field camera, wherein each of the first image and the second image comprises a plurality of sub-regions;
    determining brightness of each of the sub-regions of the second image saturated or higher than a predetermined threshold;
    recording the locations of the determined sub-regions of the second image;
    performing a local brightness redistribution process on at least one of the sub-regions of the second image according to a brightness distribution of at least one of the sub-regions of the first image to obtain a third image; and
    performing a global brightness redistribution process on the third image to obtain a fourth image.

2. The image processing method of claim 1, further comprising:
    performing a brightness analyzing process on the sub-regions of the second image, selecting at least one of the sub-regions of the second image, and performing the local brightness redistribution process on the selected at least one of the sub-regions.

3. The image processing method of claim 1, wherein the number of the at least one of the sub-regions where the local brightness redistribution process is performed is plural in the second image, and different brightness redistribution parameters are given to perform the local brightness redistribution process on the sub-regions of the second image in the step of performing the local brightness redistribution process on the at least one of the sub-regions of the second image according to the brightness distribution of the at least one of the sub-regions of the first image.

4. The image processing method of claim 1, wherein in the step of obtaining the first image and the second image by using the light field camera, the first image and the second image are obtained by using the light field camera at a first exposure time and a second exposure time respectively, and a length of the first exposure time is different from a length of the second exposure time.

5. The image processing method of claim 1, wherein a location of the at least one of the sub-regions of the second image in the second image corresponds to a location of the at least one of the sub-regions of the first image in the first image.

6. The image processing method of claim 1, wherein the light field camera comprises a lens module, a lens array, and an image sensing component, the lens module is located between an object side and an image side, the lens array is located between the lens module and the image side, the image sensing component is arranged at the image side, the lens module has a first F-number and focuses a middle image between the lens module and the lens array, the lens array comprises a plurality of sub-lenses, each of the sub-lenses has a second F-number, the lens array focuses the first image or the second image onto the image sensing component, the first F-number is different from the second F-number, and the image sensing component is configured to sense the first image or the second image.

7. The image processing method of claim 6, wherein the lens array comprises a first principle plane and a second principle plane, a ratio of a distance between the middle image and the first principle plane to a distance between the second principle plane and the image sensing component is N, and N is greater than 2.

8. The image processing method of claim 7, wherein an effective focal length of the lens module is f, a diameter of an exit pupil of the lens module is D, the second F-number of the lens array is F, and the effective focal length f, the diameter D of the exit pupil, and the second F-number F satisfy:

$$\frac{1}{N}F \le \frac{f}{D} \le \left(2 + \frac{1}{N}\right)F.$$

9. An image capturing apparatus configured to execute the image processing method of claim 1, the image capturing apparatus comprising a processing circuit and a light field camera, wherein the light field camera comprises a lens module, a lens array, and an image sensing component,
    the lens module is located between an object side and an image side and has a first F-number,
    the lens array is arranged between the lens module and the image side and comprises a plurality of sub-lenses, each of the sub-lenses has a second F-number, the lens module focuses a middle image between the lens module and the lens array, the first F-number is different from the second F-number,
    the image sensing component is arranged at the image side for sensing a light field image, and the lens array focuses the light field image onto the image sensing component.

10. The image capturing apparatus of claim 9, wherein the lens array comprises a first principle plane and a second principle plane, a ratio of a distance between the middle image and the first principle plane to a distance between the second principle plane and the image sensing component is N, and N is greater than 2.

11. The image capturing apparatus of claim 10, wherein an effective focal length of the lens module is f, a diameter of an exit pupil of the lens module is D, the second F-number of the lens array is F, and the effective focal length f, the diameter D of the exit pupil, and the second F-number F satisfy:

$$\frac{1}{N}F \le \frac{f}{D} \le \left(2 + \frac{1}{N}\right)F.$$

12. The image capturing apparatus of claim 10, wherein the number of the at least one of the sub-regions where the local brightness redistribution process is performed is plural in the second image, and when the processing circuit executes the step of performing the local brightness redistribution process on the at least one of the sub-regions of the second image according to the brightness distribution of the at least one of the sub-regions of the first image, the processing circuit performs the local brightness redistribution process on the sub-regions according to different brightness redistribution parameters.

13. The image capturing apparatus of claim 10, wherein the number of the at least one of the sub-regions where the local brightness redistribution process is performed is plural in the second image, and when the processing circuit executes the step of performing the local brightness redistribution process on the at least one of the sub-regions of the second image according to the brightness distribution of the at least one of the sub-regions of the first image, the processing circuit performs the local brightness redistribution process on the sub-regions according to different brightness redistribution parameters.

14. The image capturing apparatus of claim 10, wherein when the processing circuit executes the step of obtaining the first image and the second image by using the light field camera, the processing circuit obtains the first image and the second image by using the light field camera at a first exposure time and a second exposure time respectively, and a length of the first exposure time is different from a length of the second exposure time.

15. The image capturing apparatus of claim 10, wherein a location of the at least one of the sub-regions of the second image in the second image corresponds to a location of the at least one of the sub-regions of the first image in the first image.

* * * * *